United States Patent
Laney et al.

(10) Patent No.: US 8,056,505 B2
(45) Date of Patent: Nov. 15, 2011

(54) VENT FOR MILKING LINER

(75) Inventors: Charles Jeffrey Laney, Navarre, OH (US); Frank Saho, III, Gnadenhutten, OH (US); Aaron Kyle Kochman, Gnadenhutten, OH (US)

(73) Assignee: Lauren AgriSystems, Ltd., New Philadelphia, OH (US)

( * ) Notice: Subject to any disclaimer, the term of this patent is extended or adjusted under 35 U.S.C. 154(b) by 106 days.

(21) Appl. No.: 12/633,399

(22) Filed: Dec. 8, 2009

(65) Prior Publication Data

US 2011/0132265 A1 Jun. 9, 2011

(51) Int. Cl.
*A01J 5/04* (2006.01)
(52) U.S. Cl. .................................... 119/14.47
(58) Field of Classification Search ......... 119/14.22–29, 119/14.31, 14.36, 14.47–14.53; 164/410; 143/143; 29/235; 215/11.5, 11.4, 11.1, 355; 220/801, 203.01, 203.19, 796
See application file for complete search history.

(56) References Cited

U.S. PATENT DOCUMENTS

| | | | |
|---|---|---|---|
| 488,282 A | 12/1892 | Mehring | |
| 1,000,948 A | 8/1911 | Ridd | |
| 1,285,079 A | 11/1918 | Eklundh et al. | |
| 1,312,941 A | 8/1919 | Anderson | |
| 1,365,665 A | 1/1921 | Davies | |
| 2,099,884 A | 11/1937 | Green | |
| 2,321,236 A * | 6/1943 | Parkin | 137/860 |
| 2,341,953 A | 2/1944 | Scott | |
| 2,502,362 A | 3/1950 | Babson | |
| 2,997,980 A | 8/1961 | Noorlander | |
| 3,255,732 A | 6/1966 | Raht | |
| 3,476,085 A | 11/1969 | Noorlander | |
| 3,482,547 A | 12/1969 | Maier | |
| 3,611,993 A | 10/1971 | Norton | |
| 3,659,558 A | 5/1972 | Noorlander | |
| 3,720,235 A | 3/1973 | Schrock | |
| 3,931,795 A | 1/1976 | Duncan | |
| 3,967,586 A | 7/1976 | Noorlander | |
| 3,967,587 A | 7/1976 | Noorlander | |
| 4,196,696 A | 4/1980 | Olander | |
| 4,263,875 A | 4/1981 | Maier | |
| 4,303,038 A | 12/1981 | Thompson | |
| 4,324,201 A | 4/1982 | Larson | |
| 4,372,250 A | 2/1983 | Larson | |
| 4,441,454 A | 4/1984 | Happel | |
| 4,530,307 A | 7/1985 | Thompson | |
| 4,572,106 A | 2/1986 | Mills | |
| 4,604,969 A | 8/1986 | Larson | |
| 4,745,881 A | 5/1988 | Larson | |
| 4,756,275 A | 7/1988 | Larson | |
| 4,869,205 A | 9/1989 | Larson | |

(Continued)

FOREIGN PATENT DOCUMENTS

DE 1011212 6/1957

(Continued)

*Primary Examiner* — Rob Swiatek
*Assistant Examiner* — Ebony Evans
(74) *Attorney, Agent, or Firm* — Zollinger & Burleson Ltd.

(57) ABSTRACT

A vent plug for a milking liner has an outlet that discharges the vent air in the downstream direction. The vent plug has an outlet disposed in the downstream portion of the inner flange of the vent plug so that vent air is directed toward the outlet of the short milk tube. The vent plug outlet also may be disposed in the upstream portion of the inner flange while being configured to direct the vent air in a downstream direction.

12 Claims, 7 Drawing Sheets

U.S. PATENT DOCUMENTS

| | | | |
|---|---|---|---|
| 5,007,378 A | 4/1991 | Larson |
| 5,069,162 A | 12/1991 | Thompson |
| 5,080,041 A | 1/1992 | Steingraber |
| 5,161,482 A | 11/1992 | Griffin |
| 5,224,442 A | 7/1993 | Davies |
| 5,482,004 A | 1/1996 | Chowdhury |
| 5,572,947 A | 11/1996 | Larson |
| 5,725,947 A | 3/1998 | Johannsen |
| 5,752,462 A | 5/1998 | Petersson |
| 5,765,599 A | 6/1998 | Hernvall |
| 6,039,001 A | 3/2000 | Sanford |
| 6,055,931 A | 5/2000 | Sanford, Jr. |
| 6,164,243 A | 12/2000 | Larson |
| D447,840 S | 9/2001 | Alveby |
| 6,308,655 B1 | 10/2001 | Oosterling |
| 6,427,624 B1 | 8/2002 | Briggs |
| 6,435,132 B1 | 8/2002 | Milbrath |
| 6,546,893 B1 | 4/2003 | Happel |
| 6,588,364 B1 | 7/2003 | Petterson |
| 6,631,694 B1 | 10/2003 | Chowdhury |
| 6,722,310 B1 | 4/2004 | Alveby |
| D489,866 S | 5/2004 | Brown |
| 6,742,475 B1 | 6/2004 | McLeod et al. |
| 6,745,718 B1 | 6/2004 | Chowdhury |
| 6,755,153 B1 | 6/2004 | Chowdhury |
| 6,776,120 B1 | 8/2004 | Chowdhury |
| 6,789,501 B2 | 9/2004 | Brown |
| 6,796,272 B1 | 9/2004 | Chowdhury |
| 6,857,389 B2 | 2/2005 | Miller |
| 7,290,498 B2 | 11/2007 | Shin |
| 7,293,527 B2 | 11/2007 | Shin |
| 7,578,260 B2 | 8/2009 | Shin |
| 2002/0088402 A1* | 7/2002 | Buecker ............... 119/14.47 |
| 2004/0025794 A1 | 2/2004 | Maier et al. |
| 2004/0060520 A1 | 4/2004 | Sellner et al. |
| 2004/0089242 A1* | 5/2004 | Verstege et al. ........... 119/14.47 |
| 2004/0094096 A1 | 5/2004 | Fransen |
| 2005/0284379 A1 | 12/2005 | Shin |
| 2007/0012252 A1 | 1/2007 | Gisslegard et al. |

FOREIGN PATENT DOCUMENTS

| | | |
|---|---|---|
| EP | 1329155 | 7/2003 |
| EP | 1425959 | 6/2004 |
| FR | 1525716 | 5/1968 |
| KR | 10-1007842 | 10/2009 |

* cited by examiner

VENT FOR MILKING LINER

BACKGROUND OF THE INVENTION

1. Technical Field

This invention generally relates to milking apparatus that use milking liners to draw milk from the teat. More particularly, the invention is related to the milking liners and the vents used to vent air into the short milk tubes of the milking liners.

2. Background Information

Automatic milking machines have been used to extract milk from different mammals through most of the past century. Most of these machines include a claw that typically has four nipples that are connected to teat cup assemblies that are attached to the teats during the milking process. The teat cup assemblies include a rigid (hard plastic or metal) shell with a resilient, elastomeric milking liner (also known as a milking inflation) disposed within the shell. A short milk tube extends from the liner. A vacuum source is applied to the short milk tube and an alternating vacuum is applied to the shell to cause the liners to collapse and expand and thereby massage the teats and suck milk from the teats. The milk flows from the liners, into the short milk tube, to the nipples of the claw, and from there through a conduit to a collection tank.

Figure 1:
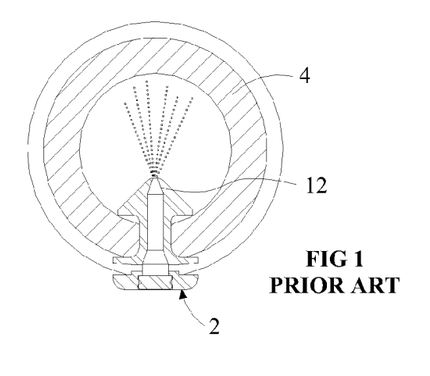
FIG. 1 is a cross section taken through a prior art vent plug and short milk tube schematically showing how vent air is pulled into the short milk tube.
Figure 2:
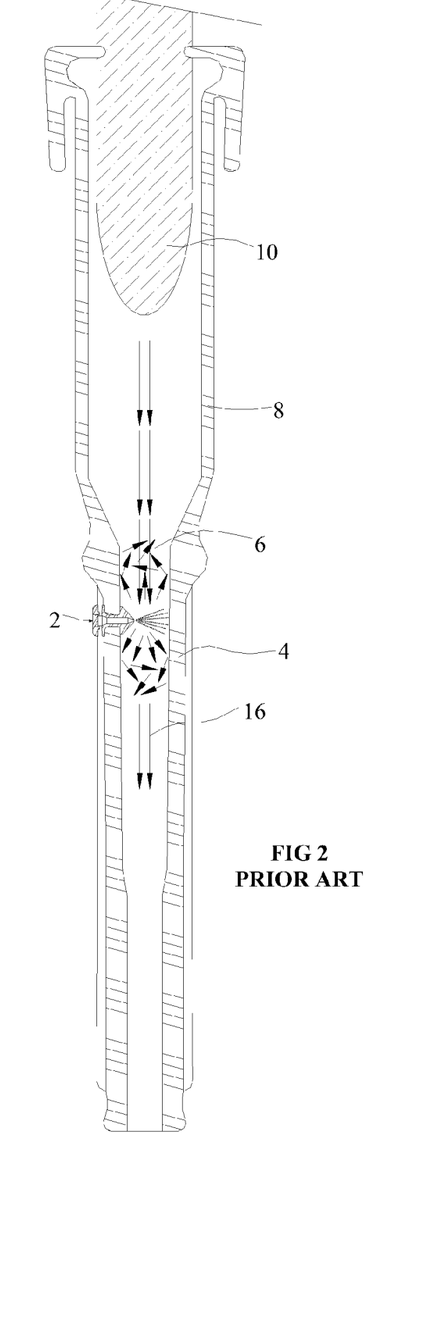
FIG. 2 is a longitudinal cross section view of the prior art vent plug and short milk tube of FIG. 1 schematically showing the disruptions to the laminar milk flow in the short milk tube.

As shown in prior art FIGS. 1 and 2, an air vent 2 is used with the short milk tube 4 to prevent the milk 6 in the bottom of the liner barrel 8 or in the short milk tube 4 from being drawn back towards the teat 10 when the barrel 8 expands. A vent plug 2 may be used to provide a venting function to the short milk tube 4. Exemplary vent plugs 2 are shown in U.S. Pat. Nos. 6,055,931, 7,290,498, and 7,293,527. Each of the vent plug structures disclosed in these patents has an outlet 12 configured to direct the vent air into the flowing milk stream 16 of the short milk tube 4. A drawback with these vent plugs is that the vent outlet 12 has a discharge direction that is disposed substantially perpendicular to the flow direction 16 of the milk. The vent air pulled into the short milk tube 4 interferes with smooth laminar milk flow 16 and can reduce milking efficiency.

SUMMARY OF THE INVENTION

The invention provides a milking liner vent plug and a milking liner having a vent that discharges the outlet air flow in a downstream direction.

In one configuration, the invention provides a vent plug for a milking liner wherein the vent plug has an outlet that discharges the vent air in the downstream direction.

In one configuration, the invention provides a vent plug for a milking liner wherein the vent plug includes a vent plug body defining a vent passage; the vent plug body having an inner flange adapted to be positioned inside the milking liner; the inner flange having an upstream portion and a downstream portion; the vent passage having a vent passage outlet adapted to be disposed inside the milking liner when the vent plug is installed in the milking liner; the vent passage having an inlet adapted to be disposed outside the milking liner when the vent plug is installed in the milking liner; and the entire vent passage outlet being disposed in the downstream portion of the inner flange of the vent plug body.

The invention also provides vent plug that discharges the vent air in the downstream direction regardless of the physical location of the outlet to the vent passage. In one configuration, a milking liner has a barrel adapted to receive the teat of the dairy animal; a short milk tube having an inlet and an outlet; the short milk tube adapted to move milk from the barrel in a downstream direction from the inlet toward the outlet; a vent plug carried by the short milk tube; the vent plug having a vent plug body that defines a vent passage; the vent plug body having an inner flange positioned inside the short milk tube; the inner flange having an upstream portion facing the inlet and a downstream portion facing the outlet; the vent passage having a vent passage outlet positioned inside the short milk tube; the vent passage having an inlet positioned outside the short milk tube; and the vent passage outlet having a downstream discharge direction.

The invention provides a method of extracting milk from a dairy animal. In one configuration, the method includes the steps of inserting an animal teat in a milking liner having a short milk tube; the short milk tube having an inlet and an outlet with a vent passage disposed intermediate the inlet and outlet; applying a vacuum to the short milk tube to draw milk and air from the short milk tube through the outlet of the short milk tube; drawing vent air through the vent passage; and discharging a majority of the vent air in the direction of the outlet.

BRIEF DESCRIPTION OF THE DRAWINGS

Similar numbers refer to similar parts throughout the specification.

DETAILED DESCRIPTION OF THE INVENTION

All of the exemplary configurations of the vent plugs described in this application are generically identified by the reference numeral 100. In general, vent plug 100 allows vent air to be drawn into a short milk tube 102 of a milking liner 104 when a barrel 106 of milking liner 104 is moving from the collapsed configuration toward the uncollapsed configuration. The vent air prevents milk from being drawn back towards barrel 106 from short milk tube 102 when barrel 106 is expanding. In the context of this application, the term "milking liner" or "liner" includes short milk tube 102 regardless of whether short milk tube 102 is integrally formed with barrel 106 or formed as a separate piece and connected later.

The discharged vent air being drawn into short milk tube 102 through vent plug 100 is indicated by the numeral 110. Vent plug 100 defines a vent passage 112 that extends entirely through vent plug 100 such that the passageway defined by short milk tube 102 is in fluid communication with the atmosphere surrounding the outer surface of short milk tube 102. Vent passage 112 includes at least one outlet 114 adapted to be disposed inside short milk tube 102 and at least one inlet 116 adapted to be positioned outside short milk tube 102. Alternative positions for outlet 114 and inlet 116 are shown in the drawings. Single or multiple outlets 114 and inlets 116 may be used. The end of vent passage 112 immediately preceding outlet 114 is the outlet tube 118. Outlet tube 118 extends into the body of vent plug 100 up to the first turn or elbow of vent passage 112. Outlet 114 and outlet tube 118 are configured to direct the vent air in a discharge direction 120. Outlet tube 118 has a longitudinal direction that is typically parallel to discharge direction 120. Vent plug 100 is configured to have a discharge direction 120 that is angled toward the downstream milk flow direction 122. Discharge direction 120 is angled toward milk flow direction 122 when it is parallel with or forms an acute angle 124 with milk flow direction 122.

The body of vent plug 100 generally includes a neck 130, an inner flange 132, and an outer flange 134. Optionally, inner flange 132 may be pointed or in the form of a cone or a pyramid so that it may be forced through the opening 136 defined by short milk tube 102 in order to install vent plug 100. Inner flange 132 has an upstream portion 140 and a downstream portion 142. Upstream portion 140 is subject to being directly impinged by the milk and air flow of short milk tube 102 and faces upwardly toward the inlet 144 of short milk tube 102. Downstream portion 142 is not subject to being directly impinged and faces downwardly toward the short milk tube outlet 146.

Figure 3:
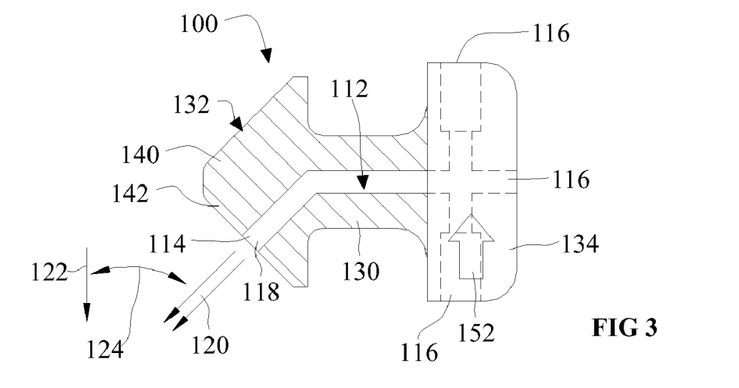
FIG. 3 is a section view of a first exemplary configuration of the vent plug of the invention.
Figure 4:
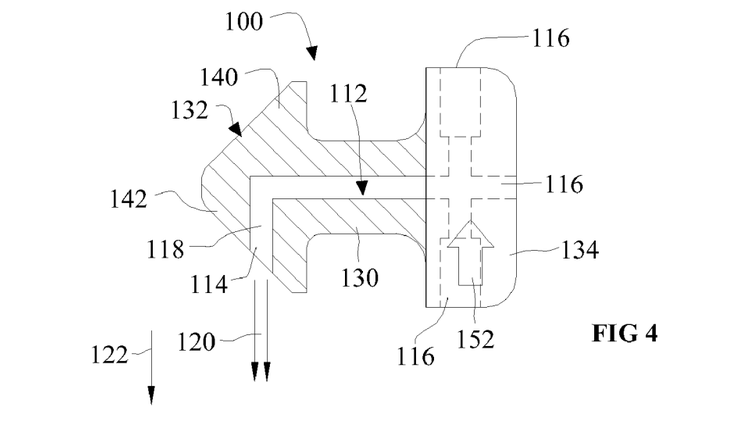
FIG. 4 is a section view of a second exemplary configuration of the vent plug of the invention.
Figure 5:
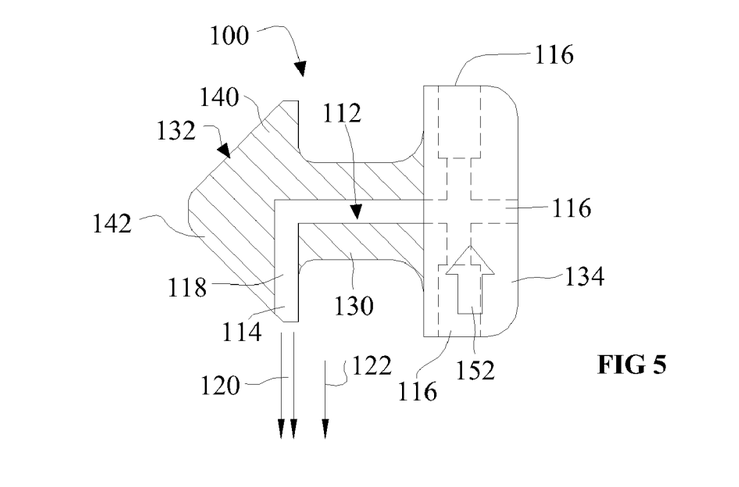
FIG. 5 is a section view of a third exemplary configuration of the vent plug of the invention.
Figure 6:
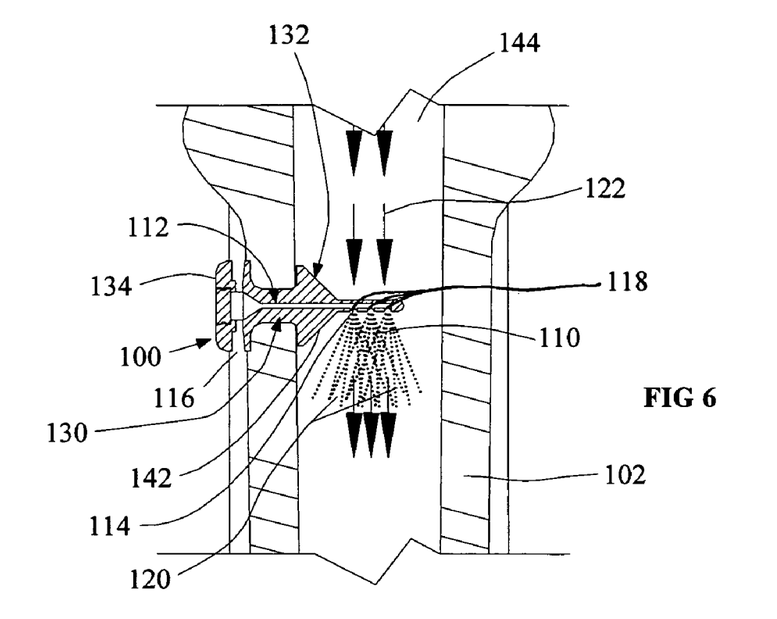
FIG. 6 is a section view of a fourth exemplary configuration of the vent plug of the invention.
Figure 7:
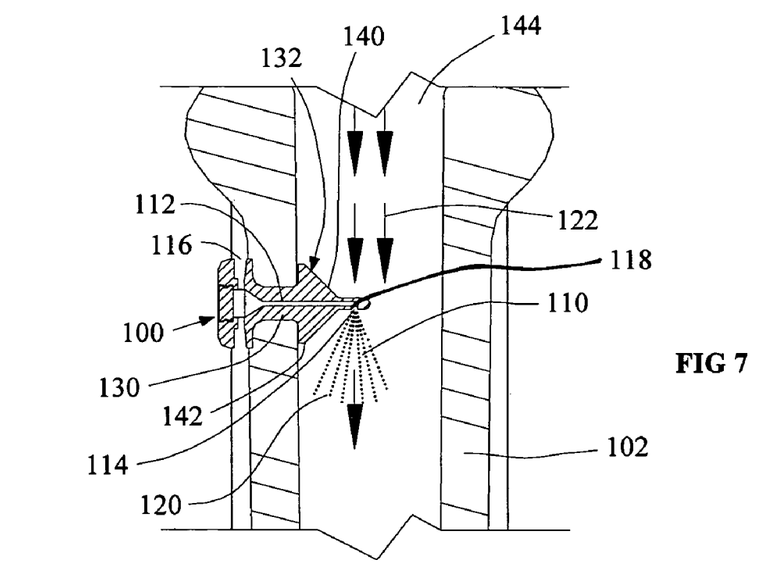
FIG. 7 is a section view of a fifth exemplary configuration of the vent plug of the invention.
Figure 8:
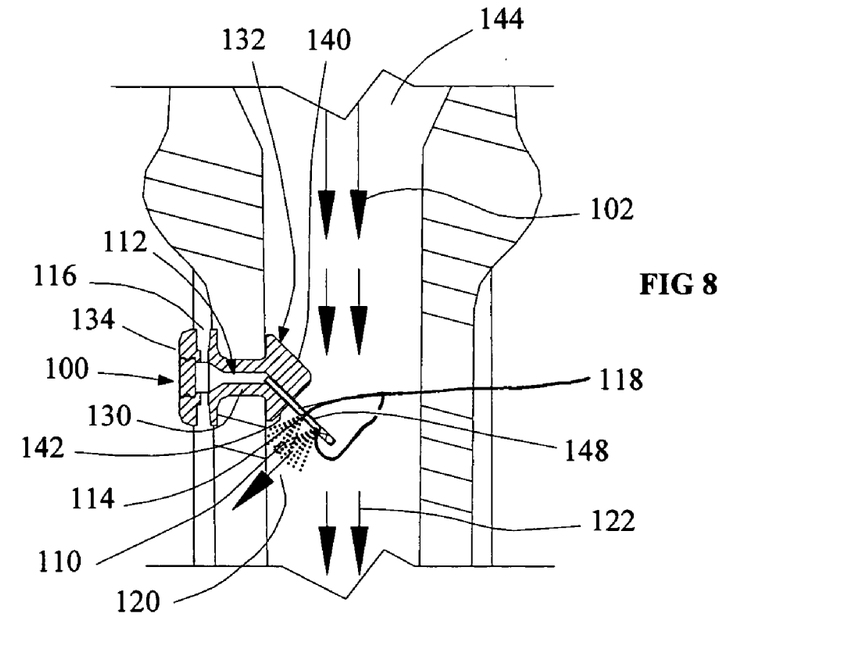
FIG. 8 is a section view of a sixth exemplary configuration of the vent plug of the invention.

In the configurations of vent plug 100 shown in FIGS. 3, 4, 5, 6, 7, and 8, outlet 114 is defined by downstream portion 142 so that vent air is discharged toward outlet 146 and does not create a turbulent restriction in the flow of milk through short milk tube 102. In other configurations, outlet 114 may be disposed in upstream portion 140 but outlet tube 118 is configured to direct discharge direction 120 towards the downstream direction. In FIG. 3, outlet tube 118 and discharge direction 120 are disposed at an acute angle with respect to the milk flow direction. In FIG. 4, outlet tube 118 and discharge direction are disposed parallel with respect to the milk flow direction. In FIG. 5, the outer wall or the abutment wall 150 of inner flange 132 defines a portion of outlet 118 so that vent air is discharge along the inner surface of short milk tube 102. In FIGS. 6 and 7, inner flange 132 includes a thin projecting nose that defines outlet 114 or a plurality of outlets 114. The nose has a thickness substantially less than inner flange 132 and may have a length that locates outlet 114 at the center of short milk tube 102. In FIG. 8, an extension tube 148 is disposed in and projects from outlet tube 118. Extension tube 148 defines outlet 114 or a plurality of outlets 114.

Figure 9:
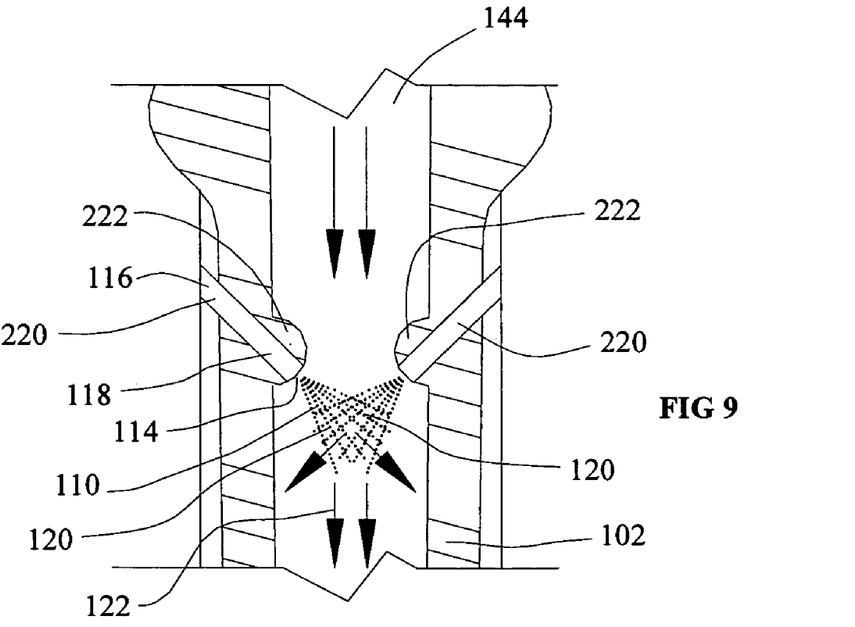
FIG. 9 is a section view of a milking liner having an exemplary configuration of an integrated vent.
Figure 10:
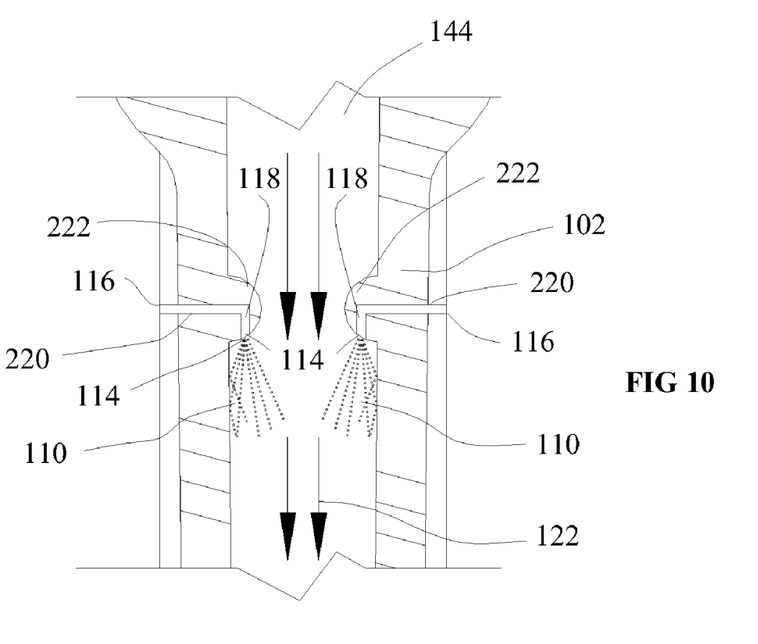
FIG. 10 is a section view of a milking liner having another exemplary configuration of an integrated vent.
Figure 11:
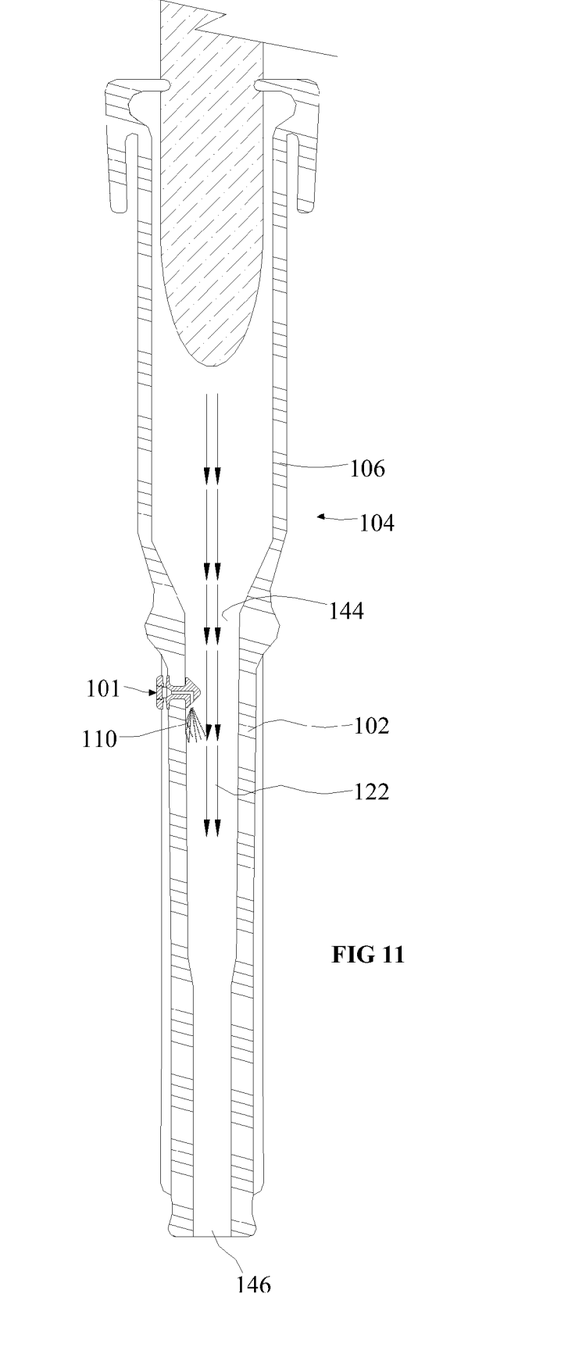
FIG. 11 is a longitudinal section view taken through a milking liner and the vent plug of FIG. 4 schematically showing the input of vent air into the short milk tube.
Figure 12:
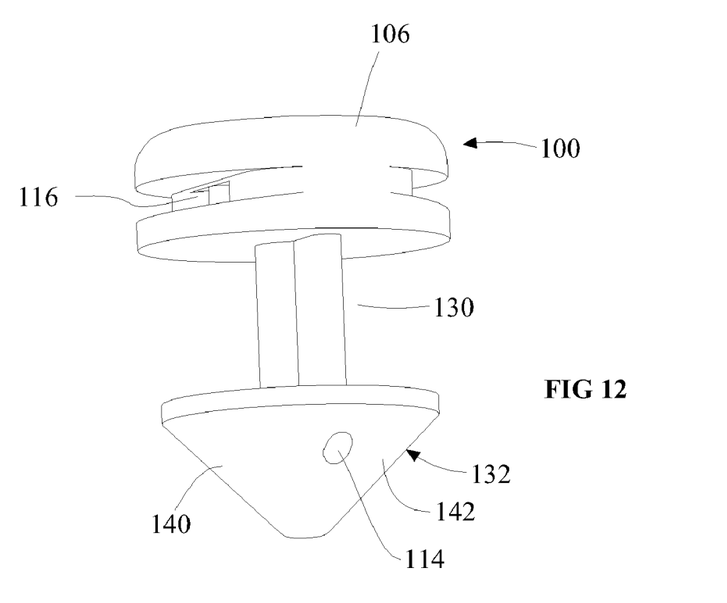
FIG. 12 is a perspective view of a vent plug configuration wherein the neck of the vent plug has a non-symmetric cross-section that properly orients the vent plug in the wall of the short milk tube.
Figure 13:
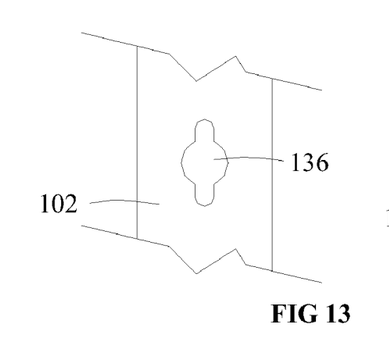
FIGS. 13-16 show different shapes for the opening in the milking liner.
Figure 14:
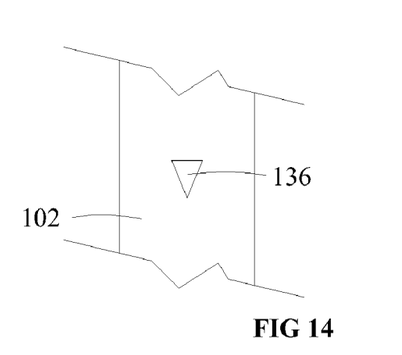
Figures 15, 16:
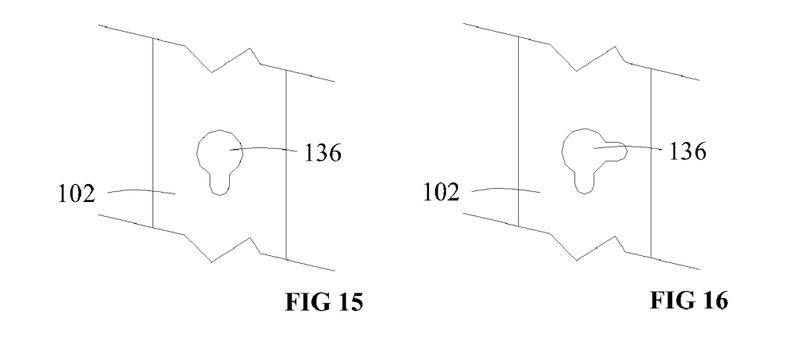

FIGS. 9 and 10 depict configurations of integrated vent passages 220 that are defined by the body of short milk tube 102. Each vent passage 220 has an outlet tube 118 angled toward the downstream direction 122 such that the discharge direction 120 of vent passage 220 is parallel to (FIG. 10) or forms an acute angle (FIG. 9) with downstream direction 122.

Each short milk tube 102 may define an inwardly disposed protuberance 222 having an upstream portion and a downstream portion with the downstream portion defining outlet 114. In other configurations, the inner surface of short milk tube 102 may be smooth without protuberance 222.

Outer flange 134 may include an indicator 152 that shows the correct installation orientation of vent plug 100. Indicator 152 may be an arrow as shown in the drawings, text, a color code, or a symbol that tells the person installing vent plug 100 the correct orientation of vent plug 100 so that the installer does not install vent plug 100 upside down. Indicator 152 also may be the shape of outer flange 134. In the configuration of FIGS. 12-16, neck 130 has an asymmetric cross section that is related to the asymmetric shape of opening 136 so that vent plug 100 can only be correctly installed in a single orientation. Exemplary asymmetric configurations are depicted in FIGS. 13-16.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of the invention is an example and the invention is not limited to the exact details shown or described.

The invention claimed is:

1. A milking liner for use with a dairy milk extraction system; the milking liner comprising:
   a barrel adapted to receive the teat of the dairy animal;
   a short milk tube having an inlet and an outlet; the short milk tube adapted to move milk from the barrel in a downstream direction from the inlet toward the outlet;
   a vent plug carried by the short milk tube; the vent plug having a vent plug body defining a vent passage; the vent passage being free of valve closures such that the vent passage remains continuously open;
   the vent plug body having an inner flange positioned inside the short milk tube; the inner flange having an upstream portion and a downstream portion; the upstream and downstream portions being defined with respect to the downstream direction of fluid flow within the milking liner;
   the vent passage having a vent passage outlet disposed inside the short milk tube when the vent plug is installed in the short milk tube;
   the inner flange of the vent plug body defining an outlet portion of the vent passage that terminates at the vent passage outlet; the outlet portion of the vent passage being angled downward from horizontal when the vent plug body is disposed horizontally;
   the vent passage having an inlet disposed outside the short milk tube when the vent plug is installed in the short milk tube; and
   the entire vent passage outlet being disposed in the downstream portion of the inner flange of the vent plug body; the upstream portion of the inner flange being free of any vent passage outlets.

2. The milking liner of claim 1, wherein the vent plug body has a neck; the neck having an asymmetric cross section; the cross section being viewed in a direction perpendicular to the vent passage.

3. The milking liner of claim 1, wherein the vent plug body has an outer flange; the outer flange having an indicator that provides an indication of the orientation of the upstream and downstream portions of the inner flange such that a user may properly orient the vent plug in a milking liner.

4. The milking liner of claim 1, wherein the outlet portion of the vent passage is parallel with the downstream direction.

5. The milking liner of claim 1, wherein the outlet portion of the vent passage is disposed at an acute angle with the downstream direction.

6. The milking liner of claim 1, wherein the inner flange defines an outer abutment surface adapted to be disposed against the inner surface of the milking liner when the vent plug is installed; the vent passage outlet being partially defined by the abutment surface.

7. A milking liner for use with a dairy milk extraction system; the milking liner comprising:
   a barrel adapted to receive the teat of the dairy animal;
   a short milk tube having an inlet and an outlet; the short milk tube adapted to move milk from the barrel in a downstream direction from the inlet toward the outlet;
   a vent plug carried by the short milk tube; the vent plug having a vent plug body that defines a vent passage; the vent passage being free of valve closures such that the vent passage remains continuously open;
   the vent plug body having an inner flange positioned inside the short milk tube; the inner flange having an upstream portion facing the inlet and a downstream portion facing the outlet; said upstream and downstream portions being defined with respect to the downstream direction of fluid flow within the short milk tube from the inlet of the short milk tube towards the outlet of the short milk tube;
   the vent passage having a vent passage outlet positioned inside the short milk tube; the upstream portion of the inner flange being free of any vent passage outlets that have an upstream discharge direction;
   the inner flange defining an outlet portion of the vent passage that terminates in the vent passage outlet; the outlet portion of the vent passage being angled downward from horizontal when the vent plug body is disposed horizontally;
   the vent passage having an inlet positioned outside the short milk tube; and
   the vent passage outlet having a downstream discharge direction.

8. The milking liner of claim 7, wherein the short milk tube defines an opening that receives the vent plug; the opening being asymmetrical is shape; the vent plug body having a neck disposed in the asymmetrically opening of the short milk tube; and the neck having an asymmetric cross section similar to the opening in the short milk tube.

9. The milking liner of claim 7, wherein the vent plug body has an outer flange; the outer flange having an indicator associated with the upstream and downstream portions of the inner flange such that a user may properly orient the vent plug in a milking liner.

10. The milking liner of claim 7, wherein the discharge direction is parallel with the downstream direction.

11. The milking liner of claim 7, wherein the discharge direction is disposed at an acute angle with the downstream direction.

12. The milking liner of claim 7, wherein the short milk tube has an inner surface and the inner flange of the vent plug defines an outer abutment surface that is disposed against the inner surface of the milking liner; the vent passage outlet being partially defined by the abutment surface.

* * * * *